United States Patent [19]

Kito et al.

[11] Patent Number: 4,691,761
[45] Date of Patent: Sep. 8, 1987

[54] HEAT EXCHANGER

[75] Inventors: Masahiro Kito, Brighton; Katsuhiro Mori, Hove, both of England

[73] Assignee: Aisin Seiki Kabushiki Kaisha, Kariya, Japan

[21] Appl. No.: 853,694

[22] Filed: Apr. 18, 1986

[30] Foreign Application Priority Data

Apr. 20, 1985 [GB] United Kingdom ............... 8510138

[51] Int. Cl.[4] ............................................ G05D 23/00
[52] U.S. Cl. ........................................ 165/32; 165/40; 138/38
[58] Field of Search ............... 165/32, 40, 179; 138/38

[56] References Cited

U.S. PATENT DOCUMENTS 2,915,294 12/1959 Christensen ..................... 165/179 X
3,086,372 4/1965 Barger et al. .................... 165/179 X
3,957,107 5/1976 Altoz et al. ........................ 165/32 X

FOREIGN PATENT DOCUMENTS 231397 1/1984 Japan .................................... 165/40

Primary Examiner—Albert W. Davis, Jr.
Assistant Examiner—Peggy A. Neils
Attorney, Agent, or Firm—Oblon, Fisher, Spivak, McClelland & Maier

[57] ABSTRACT

A heat exchanger which includes a turbulence promoter interposed between inlet and outlet ports of the heat exchanger and spring means made of a memory alloy for moving the turbulence promoter in a predetermined direction. The area of the heat transfer surface in which the heat transfer coefficient or the unit thermal conductance is increased by the turbulence promoter is changed in accordance with movement of the turbulence promoter. As a result, the heat exchanger effectiveness or temperature effectiveness is intentionally changed and the temperature at the outlet port of the heat exchanger is maintained within a certain range of temperature.

4 Claims, 2 Drawing Figures

HEAT EXCHANGER

BACKGROUND OF THE INVENTION

1. Field of the Invention

The present invention relates to a heat exchanger, more particularly a heat exchanger which can maintain a certain range of temperatures of a fluid at an outlet port of the heat exchanger.

2. Description of the Prior Art

In a conventional heat exchanger for exhaust heat recovery, a bypass passage for exhaust gas is separately provided from the heat exchanger in order to maintain a slightly higher temperature than the condensing temperature at an output port of the heat exchanger and also effectively perform heat recovery. Moreover, a temperature sensor provided at the output portion, signal transmitting means for transmitting a signal, and a changing valve located at an inlet port of the heat exchanger for controlling the exhaust gas at the inlet port according to the signal from signal transmitting means are provided for attaining the abovementioned function. Accordingly, the exhaust gas at the inlet portion of the heat exchanger is selectively supplied to the outlet port through the heat exchanger or through the bypass passage according to the temperature at the outlet port.

In the case where the exhaust gas is supplied to the outlet port through the bypass passage, heat recovery is not performed. As above mentioned, the bypass passage, the temperature sensor, the signal transmitting means, and the changing valve are quite necessary, so that the entire construction of the heat exchanger becomes complicated and the number of parts necessary is also increased.

SUMMARY OF THE INVENTION

An object of the present invention is to provide an improved heat exchanger which obviates the aforementioned drawbacks of the above-described conventional heat exchanger.

A further object of the present invention is to provide an improved heat exchanger which can maintain a certain range of temperatures of a fluid at an outlet port of the heat exchanger in spite of a change in temperature at an inlet port of the fluid, the flow rate of the fluid, and the temperature and flow rate of another fluid.

A still further object of this invention is to provide an improved heat exchanger which is simplified in construction and requires a fewer number of parts.

To achieve the objects and in accordance with the purpose of the invention, a heat exchanger according to the present invention comprises a turbulence promoter interposed between inlet and outlet ports of the heat exchanger, wherein a certain range of the temperature is required at the outlet port, and spring means made of a memory alloy for moving the turbulence promoter is provided. Accordingly, the area of the heat transfer surface in which the heat transfer coefficient or the unit thermal conductance (the dimension of which being, for example, W/m$^2$° C.) is increased by the turbulence promoter being changed in accordance with movement of the turbulence promoter. As a result, the heat exchanger effectiveness or the temperature effectiveness (dimensionless) is intentionally changed and the temperature at the outlet port is maintained within a certain temperature range.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENT

Figure 1:
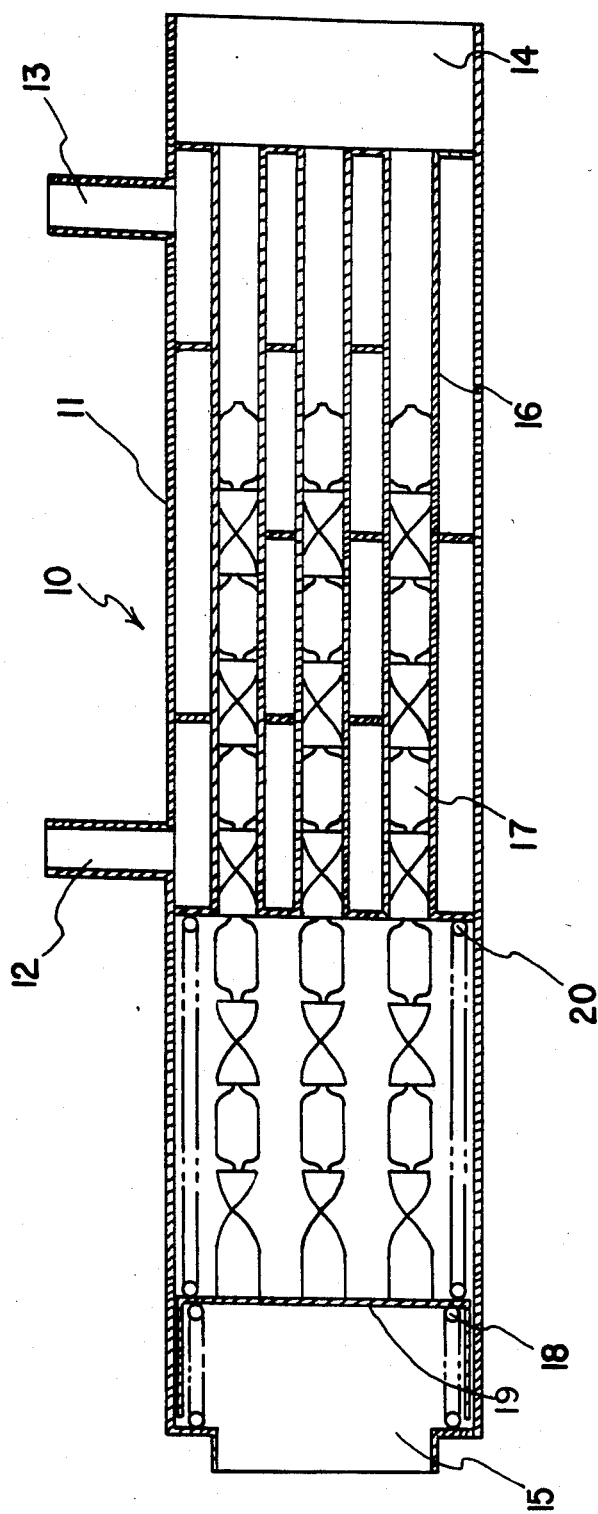
FIG. 1 is a sectional view which shows a preferred embodiment of a heat exchanger according to the present invention.

A heat exchanger according to the present invention is utilized for a shell and tube type heat exchanger as shown in FIG. 1. However, it is possible that the heat exchanger according to the present invention is also applicable for a plate type heat exchanger.

Referring now to FIG. 1 in which a shell and tube type heat exchanger 10 is illustrated, reference numeral 11 indicates a casing having a hollow cylindrical shape. The casing 11 is provided with inlet and outlet ports 12, 13 for a fluid, for example, normal water. The casing 11 is also formed with inlet and outlet ports 14, 15 for a second fluid, for example, an exhaust gas. A plurality of tubes 16 is fixedly connected to the casing 11 and a turbulence promoter 17 is moveably mounted within each tube 16. Reference numeral 18 denotes first spring means disposed within the outlet port 15 and which is made of a memory alloy for biasing the turbulence promoter 17. A left end portion of the turbulence promoter 17 is fixed to a moveable plate 19 disposed within the outlet port 15. Second spring means 20 is disposed within the outlet port 15.

One end of first spring means 18 is engaged with a left side wall of the casing 11 and other thereof is engaged with the movable plate 19. One end of second spring means 20 is engaged with the movable plate 19 and other end thereof is engaged with the tube 16.

Operation according to the present invention is as follows:

In the case where, for example, the temperature of the exhaust gas at the inlet port 14 is increased in FIG. 1, the temperature at the outlet port 15 is also increased. When the temperature at the outlet port 15 becomes higher than the memorized temperature of first spring means 18, first spring means 18 returns to the memorized shape which is in an expanded state. The memorized temperature of first spring means 18 is set within the range of the temperature to be maintained. The turbulence promoter or generator 17 is axially moved by first spring means 18 in the rightward direction via the movable plate 19 in FIG. 1 according to above-mentioned return of first spring means 18 to the memorized shape, that is, the turbulence promoter 17 assumes the state shown in FIG. 2 by the rightward urging force of first spring means 18. As a result, the area of the heat transfer surface in which the heat transfer coefficient or the unit thermal conductance (the dimension of which being, for example, W/m$^2$° C.) is increased by the length of the turbulence promoter 17 within the tubes 16 being increased. Accordingly, the heat exchanger effectiveness or the temperature effectiveness (dimensionless) is increased and the temperature at the outlet port 15 is decreased so as to be less than that of FIG. 1, so that the temperature at the outlet port 15 does not exceed the upper limit of the certain range of the temperature which is initially desired.

Figure 2:
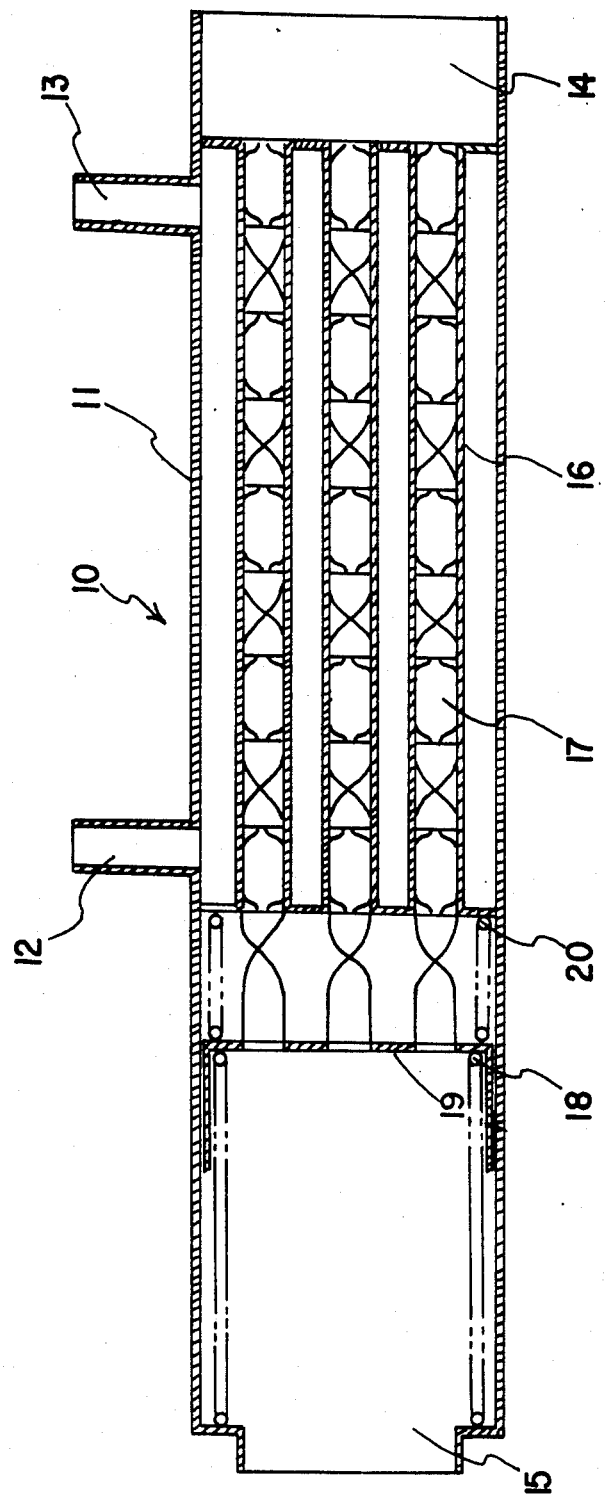
FIG. 2 is a view similar to FIG. 1, which, however, shows the actuating state of the present invention.

In the case where, for example, the temperature of the exhaust gas at the inlet port 14 is decreased in the state shown in FIG. 2, the temperature at the outlet port 15 is also decreased. When the temperature at the outlet port 15 becomes lower than the memorized temperature of first spring means 18, first spring means 18 recovers its super elasticity. Consequently, the turbulence promoter 17 is axially moved by second spring means 20 in the leftward direction via the movable plate 19 as shown in FIG. 2. That is to say, the turbulence promoter 17 reaches the state shown in FIG. 1 by the leftward urging force of second spring means 20. As a result, the area of the heat transfer surface or the unit thermal conductance in which the heat transfer coefficient is increased by the turbulence promoter 17 is decreased. Accordingly, the heat exchanger effectiveness or temperature effectiveness (dimensionless) is decreased and the temperature at the outlet port 15 is increased as compared with that of FIG. 2, so that the temperature at the outlet port 15 does not fall below the lower limit of the certain range of the temperature which is initially desired.

One of the above-mentioned operations is suitably selected according to the change of temperature at the inlet port 14, so that the temperature at the outlet port 15 can be maintained within the certain range of temperature which is initially desired. In addition, the above-mentioned operations are also executed according to the change of flow rate of the exhaust gas or the change of temperature and the flow rate of the water which flows between inlet and outlet ports 12, 13, so that the temperature at the outlet port 15 can be maintained within the certain range of the temperature initially desired.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A heat exchanger, comprising:
    a casing having a first inlet port and first outlet port for a first fluid and a second inlet port and second outlet port for a second fluid;
    a plurality of tubes fixedly connected to said casing;
    movable turbulence generating means comprising turbulence promoters movably mounted within each of said tubes and between said inlet and outlet ports;
    means for detecting a temperature within said second outlet port; and
    means within said second outlet port for biasing said turbulence promoters towards said second inlet port in response to a detection of increased temperature in said second outlet port by said detecting means, whereby an area of said turbulence promoters in said tubes is increased and a turbulence effect on flow of said second fluid is changed.

2. A heat exchanger as set forth in claim 1, wherein said temperature detecting and said biasing means are together comprised by a first spring means made of a memory alloy.

3. The heat exchanger as set forth in claim 2, wherein said biasing means further comprise movable means in said second outlet, said movable means being connected to said turbulence promoters and being directly biased by said first spring means.

4. The heat exchanger as set forth in claim 3, further comprising second spring means disposed between said movable means and said tubes for urging said movable means in a predetermined direction.

* * * * *